3,175,943
PROCESS FOR STIMULATING CHOLERESIS
Darius Molho, Boulogne, Eugène Boschetti, Venissieux, and Louis Fontaine, Lyon, France, assignors to LIPHA, Lyonnaise Industrielle Pharmaceutique
No Drawing. Filed July 2, 1962, Ser. No. 207,089
Claims priority, application France, July 13, 1961, 868,149
2 Claims. (Cl. 167—55)

The present invention relates to a new medicine having choleretic properties, formed by 4-methyl-7-hydroxycoumarine, of the formula

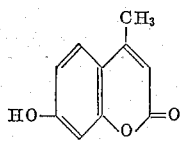

in the free state or in the form of an alkaline salt.

This compound, already known per se ("Organic Syntheses, Collective Volume No. 3, page 282"), is an odourless, yellow solid with a bitter taste and a melting point of 185° C. Its solution in distilled water has an absorption maximum at a wavelength of 325 m$\mu$. It is soluble in alkaline water; its alkaline salts and particularly the sodium salt are soluble in ordinary water; the solutions obtained have an alkaline reaction.

The choleretic activity of this compound or of its sodium salt has been established on various species and by different methods.

When the compound is administered duodenally to an albino rat, in solution in physiological serum or in propylene glycol with a dose of 50 mg./kg., it produces a considerable and prolonged increase in the biliary excretion. This choleretic activity is expressed below by the coefficient of Pesson, Salle and Auffret (Arch. Intern. Pharmacod., 1959, 119, 443), defined as follows:

A being the percentage of animals of which the choleresis is increased by more than 20% ($A=1$ if all the animals have reacted), B being the mean percentage of the increase in the choleresis during the test, only taking into account figures higher than 20%, C being the period (in hours) during which the raising of the choleresis is higher than 20%, The coefficient of Pesson, Salle and Auffret is equal to the product $A \times B \times C$.

In the above test, the coefficient has the following values for the compound according to the invention and three known choleretic medicines administered in a similar manner to series of eight rats

|  | $A \times B \times C$ |
|---|---|
| 4-methyl-7-hydroxycoumarine | 1×54.8×2.5=137 |
| Sodium dehydrocholate | 1×65×0.5=32.5 |
| Cyclohexylbutyrate ("Hebucol") | 1×69.5×2=129 |
| P-hydroxysalicyl anilide ("Driol") | 1×68.6×1=68.6 |

When injected intravenously, always with series of eight albino rats, in a dose of 50 mg./kg. and in aqueous solution, the Pesson, Salle and Auffret coefficient is as follows:

|  | $A \times B \times C$ |
|---|---|
| 4-methyl-7-hydroxycoumarine | 1×45×2=90 |
| Sodium dehydrocholate | 1×92×0.5=46 |

These results are confirmed by tests carried out on adult dogs by duodenal injection, in the dose of 100 mg./kg. in sodium solution. The biliary flow is greatly increased during the 90 minutes following the injection. In addition, a certain diuretic activity is shown. An analogous effect is obtained with 4-methyl - 7 - hydroxycoumarine itself in solution in propylene glycol. On the other hand, the undissolved compound, in suspension in gum arabic, is not absorbed.

The toxicity of the product is low. The lethal dose 50% is 2000 mg./kg. perorally, 250 mg./kg. intraperitoneally and 200 mg./kg. intravenously, when used on a mouse.

The medicine according to the invention is preferably administered in glutinised tablets containing 20 to 800 mg. of active principle, in the dose of 1 to 10 tablets per day.

A formula of a 350 mg. tablet is given below as a non-limitative example:

|  | Mg. |
|---|---|
| Active principle (sodium salt) | 200 |
| Starch | 50 |
| Lactose | 95 |
| Magnesium stearate | 5 |

The clinical testing of the medicine according to the invention was carried out on a series of 10 invalids.

These invalids had a functional digestive symptomatology, due to various degrees of anorexia, morning gastric catarrh, nausea, flatulence and post-prandial heaviness, with a certain feeling of true hypochondriasis. This more or less marked dyspeptic syndrome could be connected with an incorrect hepatic or biliary function.

In practice, 7 cases of confirmed alcoholics were concerned, but without obvious clinical signs of cirrhosis, while one case was a cirrhotic alcoholic and the last two cases were convalescents from viral hepatitis.

The new medicine was used in a dose of 2 to 3 tablets per day, containing 200 mg. of active principle, given one hour before each of two or three main meals; the period of administration was 10 to 15 days. The medicine was used in 8 cases as the major therapeutic, and most frequently as the only therapeutic, in those cases where the functional symptomatology of the "hepatism" dominated the clinical chart, and in two cases, those of an unbalanced cirrhosis and a prolonged icterus, as secondary therapeutic, the dyspeptic syndrome being of secondary significance.

The results were judged, on the one hand, on the data of the examination, which attempted to set out as precisely as possible the effect of the medicine on the functional digestive symptomatology, and on the other hand, on the complete clinical balance before and after treatment, and then on a certain number of paraclinical tests, including essentially the hepatic tests of flocculation, the galactosuria which was caused, the bilirubinaemia, the ratio between esterified cholesterol and total cholesterol, the proteinaemia, the ratio between serines and globulins, the proteinogram, the transaminases and the bromosulphophthalein.

The following were investigated systematically: possible signs of intolerance by the person being questioned and of toxicity by the study of the incidence of these products on the blood count and formula and on the blood urea in particular.

At the clinical level, the results were altogether very good on the functional dyspeptic symptomatology.

In all the cases where this symptomatology was the only or even the main one, in 6 cases out of 10, it disappeared completely and rapidly under the influence of the new medicine used as major therapeutic substance, or even as only therapeutic substance. These were observations in connection with 5 cases of alcoholics and 1 case of a convalescent from viral hepatitis.

At the biological level, the favourable action on the flocculation tests seems to be rapid. In 5 cases, these tests were negative at the start, and were not modified, but in 5 other cases these tests were positive at the start, either completely or in dissociated form. However, in all the cases, after the treatment, these tests were found to be negative, and in three cases with the new medicine as only therapeutic substance, so that it can be concluded that a rapid improvement is obtained in the sense of making these flocculation tests negative.

It is apparent that the elimination at the time of the induced galactosuria was less important after treatment and that the bilirubinaemia was clearly lowered in 3 observations where it was clearly disturbed. The various hepatic tests were distinctly improved in the observation of a cirrhotic alcoholic where the medicine only represented a secondary treatment.

In all the changes observed on the cholesterol, the ratio between esterified cholesterol and total cholesterol, the proteinaemia, the ratio of serines to globulins, the proteinogram do not depart from the scope of the spontaneous variations due to the sole technique.

The tolerance of the medicine is excellent, since in no case was there found the slightest sign of intolerance due to absorption of this product.

Finally, the medicine according to the invention is free from any action and any toxicity on the kidney and on the blood count and formula, since in no case were the blood urea and hemogram modified in a significant manner. The clinical test and the current urinary tests confirm the absence of toxicity.

The medicine of the invention can be used for therapeutic treatments necessitating an excitation of the bile secretion, by its certain and constant efficacy on the dyspeptic syndrome when this syndrome is related to an incorrect hepatic function, such as is found with alcoholics and convalescents from viral hepatitis, and by the very considerable improvement of biological tests, particularly of hepatic flocculation tests.

This medicine has the advantage of being free from any toxicity and of being perfectly tolerated.

What we claim is:

1. The method of exciting the bile secretion of invalids suffering from incorrect hepatic functioning comprising orally administering to said invalids, in dosage unit form of about 20 to about 800 mg. of a choleretic compound selected from the group consisting of 4-methyl 7-hydroxycoumarine and its alkaline salts.

2. The method of exciting the bile secretion of invalids suffering from incorrect hepatic functioning comprising orally administering to said invalids in dosage unit form about 20 to 800 mg. of the sodium salt of 4-methyl 7-hydroxycoumarine.

References Cited by the Examiner

Chemical Abstracts 31/7520$^8$, 1937; 48/5187$^e$, 1954; 50/322$^b$, 1956; 47/255$^i$, 1953; 50/13286$^a$, 1956.

Horning, Organic Syntheses, Collective Volume III, 1955, pp. 281–283.

LEWIS GOTTS, *Primary Examiner.*

FRANK CACCIAPAGLIA, Jr., *Examiner.*